April 19, 1949.  C. REILLY  2,467,911
PIPE COUPLING
Filed June 17, 1946  2 Sheets-Sheet 1
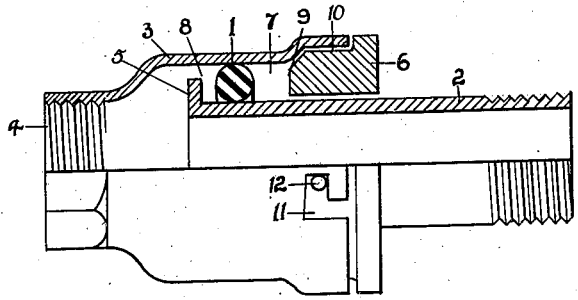
Fig I
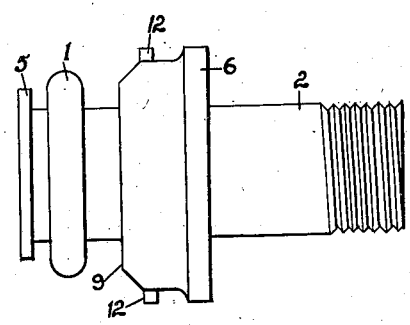
Fig II
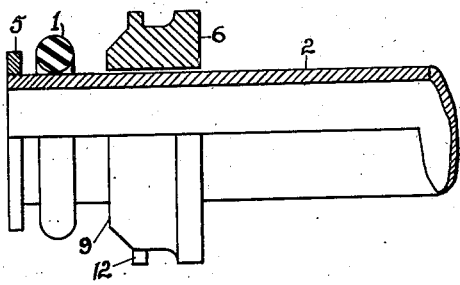
Fig III
INVENTOR:
CLAUDE REILLY
BY: Francis E. Boyce
ATTORNEY April 19, 1949.　　　C. REILLY　　　2,467,911
PIPE COUPLING
Filed June 17, 1946　　　2 Sheets-Sheet 2
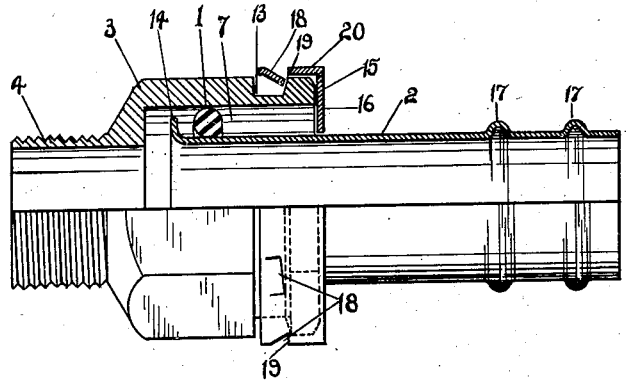
Fig IV
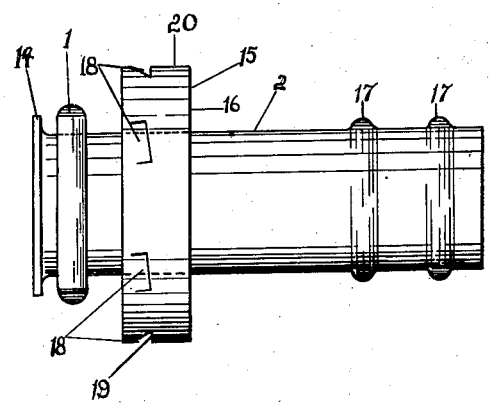
Fig V
INVENTOR:
CLAUDE REILLY
BY: Francis E. Boyce
ATTORNEY Patented Apr. 19, 1949

2,467,911

UNITED STATES PATENT OFFICE 2,467,911

PIPE COUPLING

Claude Reilly, Orange Grove, Johannesburg, Transvaal, Union of South Africa

Application June 17, 1946, Serial No. 677,351
In the Union of South Africa January 17, 1946

6 Claims. (Cl. 285—163)

This invention relates to pipe couplings and in particular to couplings used with hoses which must frequently and easily be coupled and uncoupled.

The object of the invention is to provide a pipe coupling which shall be easily manually manipulated, that is, without the use of tools, be resilient so as not to be released or have the joint weakened by any tension encountered under ordinary service conditions, and which shall be free from protuberances likely to obstruct movement of the tubing to which it is attached.

A further object is to provide a jointing adapted to be rolled under pressure to form the required fluid tight joint between the parts of the coupling during the operation of uniting them.

A preferred form of the invention is shown in the accompanying drawings in which Fig. I is an elevation of the coupling partly in section, Fig. II is an elevation of the male part of the coupling, Fig. III is an elevation, partly in section, of the male part but showing a modification, Fig. IV is an elevation similar to Fig. I but showing a modification, and Fig. V is an elevation of the male part shown in Fig. IV.

In the drawings 1 is a torus ring of rubber or other similar elastic material. It is a rolling fit on the tube 2 which has a diameter and shape adapted to fit into the line of conduit requiring coupling. 3 is the female part of the coupling conveniently terminating in a screwed socket 4 also adapted to fit into the fluid conducting line.

The end of tube 2 has a collar 5 smaller in diameter than the outside diameter of the ring 1 when compressed as shown. 6 is a sleeve, a sliding fit on tube 2 and having an outside diameter slightly larger than the uncompressed ring 1 as shown in Fig. II.

The bore 7 of the part 3 is parallel and has a diameter smaller than the normal outside diameter of ring 1.

With parts 2 and 3 coupled together as shown in Fig. I the ring 1 is compressed in the annulus 8 between the tube 2 and bore 7 but will roll in contact with the walls of the annulus 8 when the parts 2 and 3 are moved longitudinally. When the parts are coupled as in Fig. I, the ring 1 forms a fluid tight joint between them. If the fluid pressure passing through the coupling is sufficient, ring 1 will be pressed against the end face 9 of sleeve 6 and will act as a gland packing in such position.

Sleeve 6 is attached to the end of part 3 in any convenient manner. As shown, it is made to enter a recess 10 in which it is held by the bayonet slots 11 engaging the pins 12. The parts, however, may be mutually screw threaded and so engaged, or any other method may be used by which they are quickly and easily locked together and as easily separated.

To effect a coupling the two parts 2 and 3 are brought together. The collar 5 easily enters the recess 10 as also does the ring 1. When, however, the ring 1 meets the bore 7, it is rolled into same by the continued movement of part 2 into part 3. Thus the ring 1 is easily compressed in the annulus 8, as shown, to make a fluid tight joint between the two parts of the coupling.

Couplings with male and female parts having a rubber or such like packing between them to make the fluid tight joint are well known but the effectiveness of the joint has usually been due to an end pressure between the abutting parts which pressure has been created by the act of locking the parts together. In other forms one part has been forced into a stationary packing ring held in the other part. The joint according to this invention differs from those above mentioned. As described and according to this invention, the fluid tight joint is made as soon as the ring 1 starts to roll in the annulus 8 so that the joint is made under a rolling action of the torus ring 1 and consequently very little pressure is required to bring the parts together and no longitudinal pressure to maintain the joint. The locking of the parts of the coupling together is made independently of the jointing operation and can therefore be effected manually and without any strain.

In making the coupling cheaply and under mass production conditions, the form shown in Figs. IV and V may be used. In this construction the female part 3 is made with a polygonal, preferably hexagonal, body turned down and threaded at end 4. The opposite end has a groove 13 to cut the polygonal surface as shown while internally the bore 7 is parallel to the end and is not counter bored with a recess 10.

The male portion 2 has its end belled out to provide a ridge 14 to take the place of collar 5. If desired, the ridge 14 may be continued to form a beaded edge (not shown).

The sleeve 6 becomes, in this design, a pressed plate cover 15 having an internal flange 16 perforated to fit easily the tube 2 on which it is retained by one or more swellings 17, 17. These swellings may also be of service in retaining a rubber or like hose on the end of tube 2.

The periphery 20 of cover 15 is made internally a neat fit over the polygon of body 3 and is indented at equidistant points 18, the number of points corresponding with the number of flats on the polygonal portion 3. These indentations 18 should each leave a sharp indented edge 19 as shown.

When the parts are assembled as in Fig. IV and the cover 15 made to close the bore 7, the indentations 18 will pass over the flats of the polygon and come to rest in groove 13. Rotating the cover 15 will bring the indentations 18 opposite the apexes 19 of angles of the polygon over which the indentations 18 cannot pass and the cover 15 will be held thereon. The indentations 18 may be so punched that the edges 19 lie at an angle to the end surface 16 of cover 15 while the inside wall of groove 13 may be beveled slightly to make a good bearing surface with edges of the indentations 18.

Under high pressure of fluid in the coupling, the torus ring 1 may be pressed up against the end face 9 of sleeve 6 (or against the inside of flange 16 of cover 15) to make the coupling fluid tight. The higher the pressure, the more ring 1 is deformed to make a tighter joint.

What I claim as new and desire to secure by Letters Patent is:

1. A pipe coupling comprising two hollow telescoping cylinders each having means for connecting it to a pipe line, an annular parallel walled space between the cylinders in length longer than its width, a resilient torus ring therein having in section a diameter greater than the width of said annular space, a clearance in the annular space for longitudinal rolling movement of the ring, and a sleeve fixed to the end of the outer of the telescoping cylinders and forming a closure for the end of the annular space between the cylinders.

2. A pipe coupling comprising two hollow telescoping cylinders each having means for connecting it to a pipe line, an annular parallel walled space between the cylinders in length longer than its width, a resilient torus ring therein having in section a diameter greater than the width of said annular space, a clearance in the annular space for longitudinal rolling movement of the ring, a sleeve fixed to the outer of the telescoping cylinders and forming a closure for the end of the annular space between the cylinders, and a collar on the end of the inner cylinder smaller in diameter than the bore of the outside cylinder.

3. A pipe coupling comprising two hollow telescoping cylinders each having means for connecting it to a pipe line, an annular parallel walled space between the cylinders in length longer than its width, a resilient torus ring therein having in section a diameter greater than the width of said annular space, a clearance in the annular space for longitudinal rolling movement of the ring, and a sleeve bored to form a sliding fit on the inner of said telescoping cylinders and bayonet slots and pins in the end of the larger telescoping cylinder and the sleeve respectively to lock the cylinders together.

4. A pipe coupling comprising two hollow telescoping cylinders each having means for connecting it to a pipe line, an annular parallel walled space between the cylinders in length longer than its width, a resilient torus ring therein having in section a diameter greater than the width of said annular space, a clearance in the annular space for longitudinal rolling movement of the ring, a polygonal surface on the end of the outside cylinder, a circumferential channel in said polygonal surface, a cup like cover bored centrally to form a sliding fit on the inner cylinder and with the bore of its rim greater in radius than the polygonal surface, inwardly projecting indentations in the rim of said cover disposed around its inner periphery and positioned to pass over the flats of the polygonal surface but not the apexes of the same.

5. A pipe coupling comprising two hollow telescoping cylinders each having means for connecting it to a pipe line, an annular parallel walled space between the cylinders in length longer than its width, a resilient torus ring therein having in section a diameter greater than the width of said annular space and adapted to roll in contact with the walls of said annular space with the telescopic movement of the cylinders and a sleeve fixed to the end of the outer telescoping cylinder and forming a closure for the end of the annular space between the cylinders.

6. A pipe coupling comprising two hollow telescoping cylinders each having means for connecting it to a pipe line, an annular parallel walled space between the cylinders in length longer than its width, a resilient torus ring therein having in section a diameter greater than the width of said annular space, a clearance in the annular space for longitudinal rolling movement of the ring, a sleeve fixed to the end of the telescoping cylinders and forming a closure for the end of the annular space between the cylinders, and swellings on the exterior surface of the inner cylinder near its end adapted to fit into a pipe line.

CLAUDE REILLY.

REFERENCES CITED

The following references are of record in the file of this patent:

UNITED STATES PATENTS

| Number | Name | Date |
|---|---|---|
| 1,363,974 | Heylman | Dec. 28, 1920 |
| 2,146,641 | McWane | Feb. 7, 1939 |